US008161835B2

(12) United States Patent
Bornträger

(10) Patent No.: US 8,161,835 B2
(45) Date of Patent: Apr. 24, 2012

(54) MULTI-GROUP TRANSMISSION AND METHOD FOR CHANGING GEAR IN A MULTI-GROUP TRANSMISSION

(75) Inventor: Kai Bornträger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 461 days.

(21) Appl. No.: 12/302,094

(22) PCT Filed: Apr. 25, 2007

(86) PCT No.: PCT/EP2007/054039
§ 371 (c)(1),
(2), (4) Date: Nov. 24, 2008

(87) PCT Pub. No.: WO2007/134943
PCT Pub. Date: Nov. 29, 2007

(65) Prior Publication Data
US 2009/0107289 A1    Apr. 30, 2009

(30) Foreign Application Priority Data

May 24, 2006  (DE) .......................... 10 2006 024 370

(51) Int. Cl.
*F16H 3/08* (2006.01)
*F16H 47/00* (2006.01)
(52) U.S. Cl. .............................. 74/331; 74/345; 475/207
(58) Field of Classification Search .................... 74/331, 74/345; 475/207
See application file for complete search history.

(56) References Cited

U.S. PATENT DOCUMENTS

| 5,239,887 A * | 8/1993 | Muller et al. ............ 74/665 GA |
| 7,201,703 B2 * | 4/2007 | Ochi et al. .................... 477/174 |
| 7,621,839 B2 * | 11/2009 | Jackson ........................ 475/214 |
| 2006/0025272 A1 * | 2/2006 | Pelouch ........................ 475/214 |
| 2007/0214903 A1 * | 9/2007 | Forsyth ............................ 74/325 |

FOREIGN PATENT DOCUMENTS

| DE | 42 26 575 A1 | 9/1993 |
| DE | 199 22 116 A1 | 11/2000 |
| DE | 101 35 327 A1 | 1/2003 |
| DE | 101 43 994 A1 | 3/2003 |

* cited by examiner

*Primary Examiner* — Justin Holmes
*Assistant Examiner* — Jacob S Scott
(74) *Attorney, Agent, or Firm* — Davis & Bujold, P.L.L.C.

(57) ABSTRACT

An automated multi-group standard transmission, for a utility vehicle, and a process for changing gears in the multi-group transmission. The multi-group transmission includes at least two multi-speed transmission groups arranged one after the other, such that a multitude of gears can be shifted. A transmission input shaft that can be connected to an engine, via a startup element, is associated with a first transmission group and a second transmission main shaft is associated with a second transmission group. Load shifting mechanisms produce a temporary direct connection between the transmission input shaft and the transmission main shaft such that an intermediate gear can be shifted during a gear change from an original gear into a target gear. The load shifting mechanism enables gear changes that are virtually free of interruptions in load transfer during a gear change from a lower to a higher gear, thus increasing a high operational comfort.

17 Claims, 7 Drawing Sheets

MULTI-GROUP TRANSMISSION AND METHOD FOR CHANGING GEAR IN A MULTI-GROUP TRANSMISSION

This application is a national stage completion of PCT/EP2007/054039 Apr. 25, 2007, filed which claims priority from German Application Serial No. 10 2006 024 370.6 filed May 24, 2006.

FIELD OF THE INVENTION

The invention concerns a multi-group transmission and a method for changing gears in a multi-group transmission.

BACKGROUND OF THE INVENTION

Multi-group transmissions are used as multi-speed transmissions mainly in utility vehicles. They consist of a power split transmission as a transfer case or input transmission, a main transmission as the basic transmission and a range transmission as a rear-mounted transmission. These transmissions are increasingly more frequently configured as automated standard transmissions, such as the Applicant's known ASTRONIC transmission system typically make available a number of 8, 10, 12 or 16 gears. They offer more operating comfort in comparison with conventional manual transmissions, in particular an easier and almost force-free operation, high security against shifting errors, as well as an extended clutch service life. In addition, these automated standard transmission offer smoother gearshifting, as well as a higher degree of transmission efficiency with comparatively lower production costs in comparison with automatic transmissions.

A fundamental disadvantage of this automated standard transmission in comparison to other automatic transmissions is, however, that it does not shift under load, but is subject to an interruption of tractive force during gear changes when shifting the usual shift elements (jaw clutches, synchronizing devices). This can slow the driving speed of the vehicle, depending on the driving situation, in particular with regard to heavy trucks, in such a way that a shift-in takes place immediately after a shifting operation has ended. A standstill can even occur in an extreme case, when driving uphill with heavy load or starting on an uphill.

Known from DE 101 43 994 A1 of the Applicant is a multi-group transmission with transfer case, basic transmission, and range transmission in which the gear transition in the transfer case is greater than the gear transition in the basic transmission, where the front-mounted group functions as a main transmission and the basic transmission group functions as a power split transmission.

The multi-group transmission is configured as a change speed transmission with countershaft design. It has an input shaft that is associated with the front-mounted group having two gears and a main shaft, which is associated with the downstream two-speed, three-speed or four-speed basic transmission, where the gear wheels, which are mounted so as to rotate, for the different gears on a countershaft engage with correspondingly fixed gear wheels on the input shaft or the main shaft. The gear wheels of the input shaft and the main shaft can, in turn, be connected to their shafts (input shaft/main shaft) via shifting mechanisms in a rotationally fixed manner.

The input shaft and the main shaft of this multi-group transmission are arranged co-axially with respect to each other, where a gear wheel that can be connected to the input shaft, via a shifting mechanism in the front-mounted transmission, is arranged on the main shaft so that an operative connection can be produced between the front-mounted transmission and the basic transmission. The range transmission is connected downstream of the axially opposite end of the main shaft. This transmission group is configured as a planetary gear, which is connected to an output shaft of the multi-group transmission and offers two further transmission ratios so that a maximum possible number of gears is obtained from the multiplication of the individual number of gears of the three transmission groups. The highest gear can be configured thereby as a direct gear, that is, with a gear transmission ratio of 1 or as overdrive with a gear transmission ratio of less than 1.

A realization of different transmissions with different numbers of gears and torques is made possible with a relatively low cost and construction expenditure by way of this modular transmission system. The transmission system can be configured as a manual transmission or a partially automated transmission.

It is thereby disadvantageous that the known multi-group transmission has the tractive force interruption known from the standard transmissions, which can lead to the above-described problems during gear changes and high comfort loss during driving operation, especially in utility vehicles.

Also known from DE 101 35 327 A1 is an automated change speed transmission in single-group design, typically with 6 gears, as well as a process for gear change with a transmission such as this, in which a startup clutch is engaged by way of a drive engine only up to a slip limit during a shifting operation. The input shaft is accelerated via the drive engine until it reaches a synchronous speed for the target gear during the shift-in operation. A further speed increase leads to slipping of the clutch so that the speeds of the drive engine and the input shaft are adapted, when the clutch is operated exactly at the slip limit. For this reason, the speed of the drive engine is adjusted, via a controller, in the direction of the synchronous speed of the target gear at the same time as the clutch is disengaged during a shifting operation and the clutch is subsequently engaged up to the slip limit in order to appropriately accelerate the input shaft.

The operation of the clutch at the slip limit makes an improved operating comfort possible, since torque peaks, which are produced by the roadway on the drive train, are not supported on the drive engine, but lead to a slipping of the clutch. In addition, shortened shifting times result, because the clutch is operated at the slip limit, since the synchronous speed of the respective target gear is reached faster and the tractive force interruptions induced by the transmission are shorter for this reason.

An intermediate gear can also be shifted between an original gear and a target gear in a shifting operation during which one or several gears are skipped, where the slip limit of the clutch and the corresponding synchronous speed are then adapted to the intermediate gear.

It is considered disadvantageous that the operation of the startup clutch at the slip limit is subjected to relatively intensive wear due to the frequent gearshifting. The known method is also envisioned only for increasing the speed of one input shaft during shift-in operations, that is, during a desired gear change to a lower gear. A reduction in the duration of the tractive force interruption can be achieved in this way during shift-in, but not during acceleration of the vehicle and upshift operations connected therewith. In addition, the known process for gear change in single group transmissions is not suitable by implication for multi-group transmissions, which have one input shaft and at least one further main shaft.

Based on this background, it is the objective of the invention to create a multi-group transmission with a high operating comfort, which makes a gear change that is virtually free of tractive force interruptions possible, in particular during the change from a lower to a higher gear.

SUMMARY OF THE INVENTION

The invention is based on the realization that a speed reduction of the drive engine to a target speed during a gear change in a multi-group standard transmission releases a torque which can be utilized with the aid of suitable load shifting mechanisms to increase the drive torque of the vehicle and to compensate for the tractive force interruption during gear change.

Accordingly, the invention is based on a multi-group transmission, in particular an automated multi-group standard transmission for a utility vehicle, having at least two multi-speed transmission groups arranged one behind the other, via which a multitude of gears can be shifted, where a transmission input shaft associated with a first gear group can be connected, via a startup element, to the drive engine of the vehicle and a transmission main shaft is allocated to a second transmission group. In order to attain the objective of the invention, the load shifting mechanisms are provided between the transmission input shaft and the transmission main shaft so as to produce a temporary direct connection, via which an intermediate gear can be shifted during a gear change from an original gear to a target gear.

The design of a multi-group transmission with an input transmission and a main transmission makes a direct connection possible, between an input shaft and a main shaft, via the load shifting mechanisms in order to reduce the speed of the drive engine via the startup element, that is, a startup clutch, and thereby utilize the dynamic torque of the drive engine to shift to an intermediate gear, while the jaw clutches and synchronizations of the two transmission groups are shifted to their neutral position during gear change.

Advantageously achieved by way of this intermediate gearshifting is that the vehicle makes available a tractive force support during a shifting operation which is desired and allowed by the driver and which makes driving in the desired target gear possible after the shifting operation has ended and also reliably prevents, in particular, an immediate shift-in, due to a speed reduction caused by the tractive force interruption during gear change.

The intermediate gear can also be configured as a direct gear. The direct gear is automatically shifted as an intermediate gear by way of the direct connection of the input shaft to the main shaft, taking only into consideration the input group and the main group, when these are without load. The direct gear, that is, the gear with direct gear ratio 1:1, corresponds to the highest gear of the transmission, when no overdrive is provided. An intermediate gear, which does not correspond to the direct gear of the overall transmission, but only to the highest gear resulting from the input transmission and the main transmission, is basically also possible in a multi-group transmission with a rear-mounted group, for example, a two-speed range transmission, during shifting operations in the lower range. It is particularly advantageous, however, to always shift to the direct gear as an intermediate gear, while also including the rear-mounted group, by shifting to the upper range of the range transmission in order to achieve the most effective speed reduction of the drive engine via load shifting mechanisms.

A disk clutch can be provided as particularly effective and simple load shifting mechanisms. The latter is arranged between the first transmission group and the second transmission group in the simplest case. The load shifting mechanisms or disk clutch can likewise be provided between the startup element and the first transmission group. This is made possible by way of a main shaft, which is axially guided through the input transmission and is connected to an inner clutch part of the disk clutch, so that the disk clutch is arranged between the startup clutch and the transmission input and is also connected via an outer clutch part to the input shaft and the input transmission. The axial preference of the disk clutch makes an especially compact design possible, in particular, in a two-speed or three-speed main transmission.

Furthermore, the intermediate gearshifting can also be used in a multi-group transmission in which the first transmission group is configured as a two-speed power split transmission; the second transmission group is configured as a two-speed, three-speed or four-speed main transmission, and the third transmission group is configured as a two-speed range transmission arranged downstream of the second transmission group. An electric, hydraulic and/or pneumatic transmission control is preferably provided for automatic shifting of at least the gears of one of the transmission groups, preferably all gears.

In this type of transmission design, which is used in particular in heavy transport vehicles, the compensation of the tractive force interruption during gear change has a particularly advantageous effect, since tractive force interruptions can have a serious effect when driving uphill within the permissible threshold with heavy vehicles. The load shifting mechanisms can also be especially combined with a multi-group transmission in a space-saving and weight-saving two-countershaft design, as is provided especially in trucks and buses, and described in DE 199 22 116 A1.

A further objective of the invention is the disclosure of a process for gear change with a multi-group transmission with which gear changes are made possible with high operational comfort and, for the most part, free of tractive force interruptions.

In addition, the invention is based accordingly on a process for changing gears in a multi-group transmission, especially in automated multi-group standard transmissions, for example, in a utility vehicle, having at least two multi-speed transmission groups arranged one after the other, via which a multitude of gears can be shifted, where a transmission input shaft is associated with a first transmission group, which can be connected via a startup element to a drive engine of the vehicle and a transmission main shaft is associated with the second transmission group. The invention also envisions that a direct connection between the transmission input shaft and the transmission main shaft, via which an intermediate gear is shifted, is produced during the gear change from an original gear into a target gear with the aid of load shifting mechanisms in order to attain the stated objective.

Tractive force interruptions can be prevented or at least considerably reduced during gear change in an automated multi-group standard transmission by way of the intermediate gear. In order to achieve a particularly effective tractive force support, it can also be provided that at least the following steps are carried out during intermediate gearshifting:

a) shifting the shift elements of the first and the second transmission groups to a neutral position with incipient slip of the drive engine and with the transmission groups becoming loadless at the start of the disengagement of the original gear;

b) closing the direct connection between the transmission input shaft and the transmission main shaft concurrently with the preceding step and shifting the intermediate gear with subsequent adaptation of the speeds of the drive engine and the connected transmission shafts until a speed of the target gear is reached, and c) shifting to the target speed in the transmission groups and a concurrent disengagement of the connection between the transmission input shaft and the transmission main shaft.

In order to start the gear change as soon as the startup clutch transmits the full engine torque with slip, the transmission groups (the input transmission and the main transmission) are shifted without load and also the jaws and synchronizations are shifted in neutral. The intermediate gear is shifted via the load shifting mechanisms and the engine speed of the drive engine is lowered in this way, until the input transmission and the main transmission rotate at the speeds of the target gear. The main transmission and the input transmission are then shifted to the new gear (target gear) and the load shifting mechanisms are disengaged, that is, the direct connection between input shaft and main shaft is again separated, where the intermediate gear is again disengaged and the gear change is concluded.

BRIEF DESCRIPTION OF THE DRAWINGS

The invention will now be described, by way of example, with reference to the accompanying drawings in which.

DETAILED DESCRIPTION OF THE INVENTION

Figure 1:
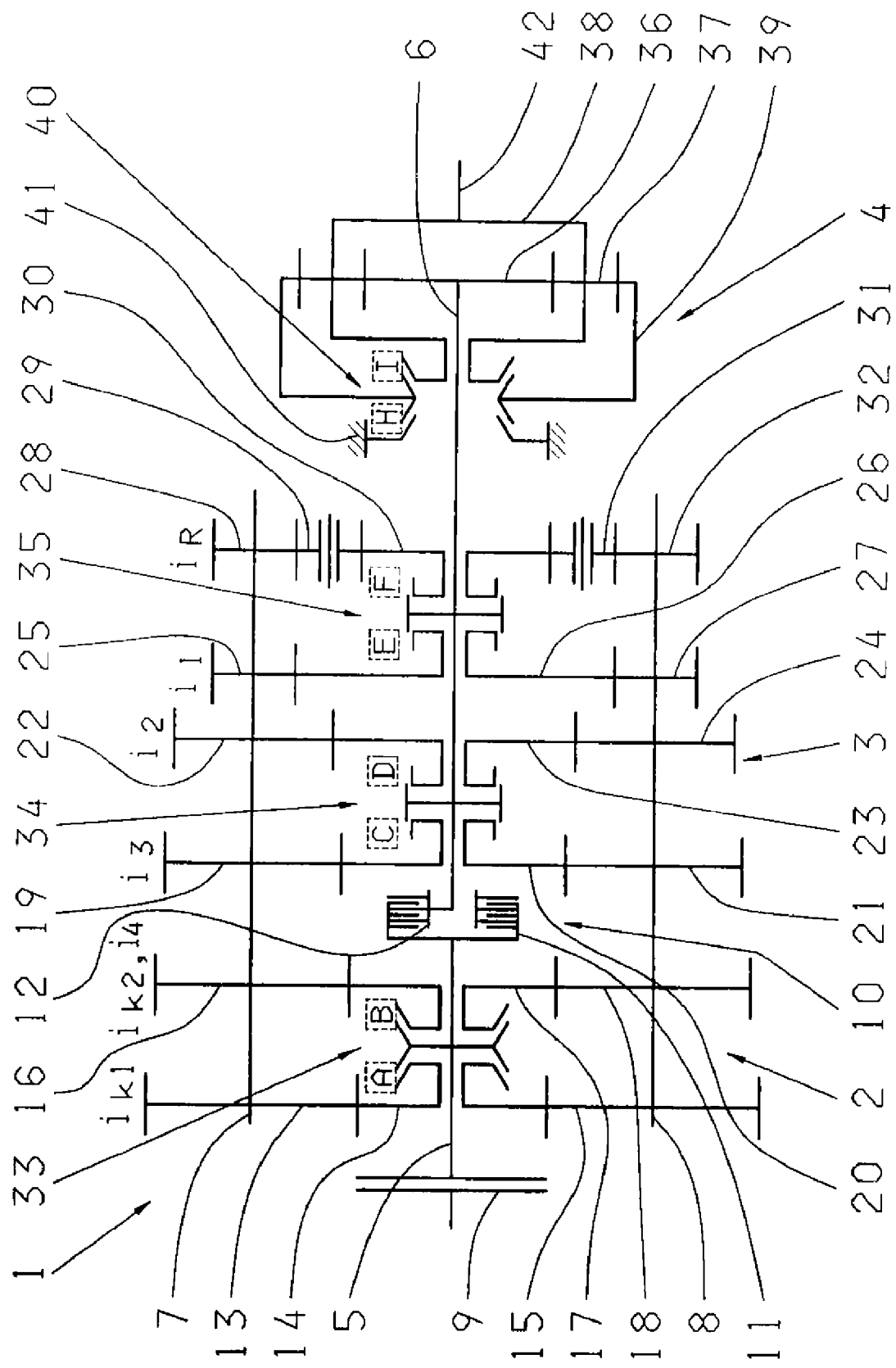
FIG. 1 shows a schematic representation of a first exemplary embodiment of a multi-group transmission with an intermediate gearshift according to the present invention.

A multi-group transmission, which is configured as an automated two-countershaft transmission 1 of a utility vehicle having three transmission groups 2, 3 and 4 is accordingly represented in FIG. 1. A transmission controller (not depicted here) is provided for functional control. A transmission such as this and its mode of operation—without intermediate gearshift—are known to experts from the ZF-AS-TRONIC series of the Applicant. The transmission shown here is configured as a 16-gear version, whereby the 16$^{th}$ gear is engaged as a direct gear.

A startup element 9, preferably configured as an engine clutch, is arranged on the input side on an input shaft 5 of the transmission 1. A drive engine (not shown) of the vehicle can be connected to the transmission 1 via the startup clutch 9. The input shaft 5 leads into the first transmission group 2, which is configured as a two-speed power split transmission. A main shaft 6 guided through the second transmission group 3, which is configured as a four-speed main transmission, is arranged co-axially with respect to the input shaft 5. The transmission shafts 5 and 6 are mounted so as to rotate between two countershafts 7 and 8 and arranged in parallel, where two rotationally fixed gear wheels are engaged on the first and second countershafts 7 and 8 with a corresponding idler gear on the input shaft 5 or main shaft 6, in order to realize the transmission ratios (gears).

The power split transmission 2 has a first gear constant $i_{k1}$ from a first gear wheel combination with gear wheels 13, 14, 15 and a second gear constant $i_{k2}$ from a second gear wheel combination with the gear wheels 16, 17, 18. The gear constants $i_{k1}$ and $i_{k2}$ can be shifted to two positions A or B with a shifting mechanism 33, via which the respective idler gear 14 or 17 can be connected in a rotationally fixed manner to the input shaft 5 with shifting and synchronization elements, which are not explicitly represented.

The gear constant $i_{k2}$ functions, at the same time as a fourth gear $i_4$ of the main transmission 3. The main transmission 3 has a third gear $i_3$ from a third gear wheel combination with the gear wheels 19, 20, 21 and a second gear $i_2$ from a fourth gear wheel combination with the gear wheels 22, 23, 24. The gears $i_2$ and $i_3$ can be shifted, in turn, with a shifting mechanism 34 between two positions C or D.

Furthermore, the main transmission 3 has a first gear $i_1$ from a fifth gear wheel combination with the gear wheels 25, 26, 27 and a reverse gear $i_R$ from a sixth gear wheel combination with the gear wheels 28, 29, 30, 31, 32. The gears $i_1$ and $i_R$ can be shifted, in turn, with a further shifting mechanism 35 between two positions E and F.

A range group transmission 4 is arranged downstream in relation to the drive at the end of the main shaft 6 opposite the power split group 2. This rear-mounted group 4 is configured as a planetary gear, having a central sun gear 36, which meshes with a planetary gear set 37 mounted on a planetary gear carrier 38. A ring gear 39 of the group transmission 4 meshes with the planetary gears 37 and can be alternatively connected to a housing 41 or to an output shaft 42 of the multi-group transmission 1, via a shifting mechanism 40 with two shift positions H or I.

A total of overall 2×4×2=16 gears can thus be represented by way of a combination of shift positions A, B, C, D, E, F, H and I. The shifting sequence is obtained by alternatively shifting through the gear combination of the main transmission 3 and the power split transmission 2. The range transmissions are then engaged and the combination sequence is repeated until the highest gear (direct gear) is engaged. A second reverse gear transmission ratio is available, in addition to the first reverse gear $i_R$ of the main transmission 3, by engaging the power split transmission 2.

A load shifting mechanism 10, advantageously configured as a disk clutch, is arranged between the input shaft 5 and the main shaft 6. The input shaft 5 is connected to driving friction disks and an outer clutch part 11 of the disk clutch 10 at its end that faces away from the startup clutch 9. The main shaft 6 is connected to an inner clutch part 12, having friction disks driven between the outer friction disks at its end that faces away from the output shaft 42. A friction-locked and thus rotationally fixed connection can be produced, between the input shaft 5 and the main shaft 6, via an axial shift of the clutch parts 11 and 12, by way of the transmission controller.

Figure 3:
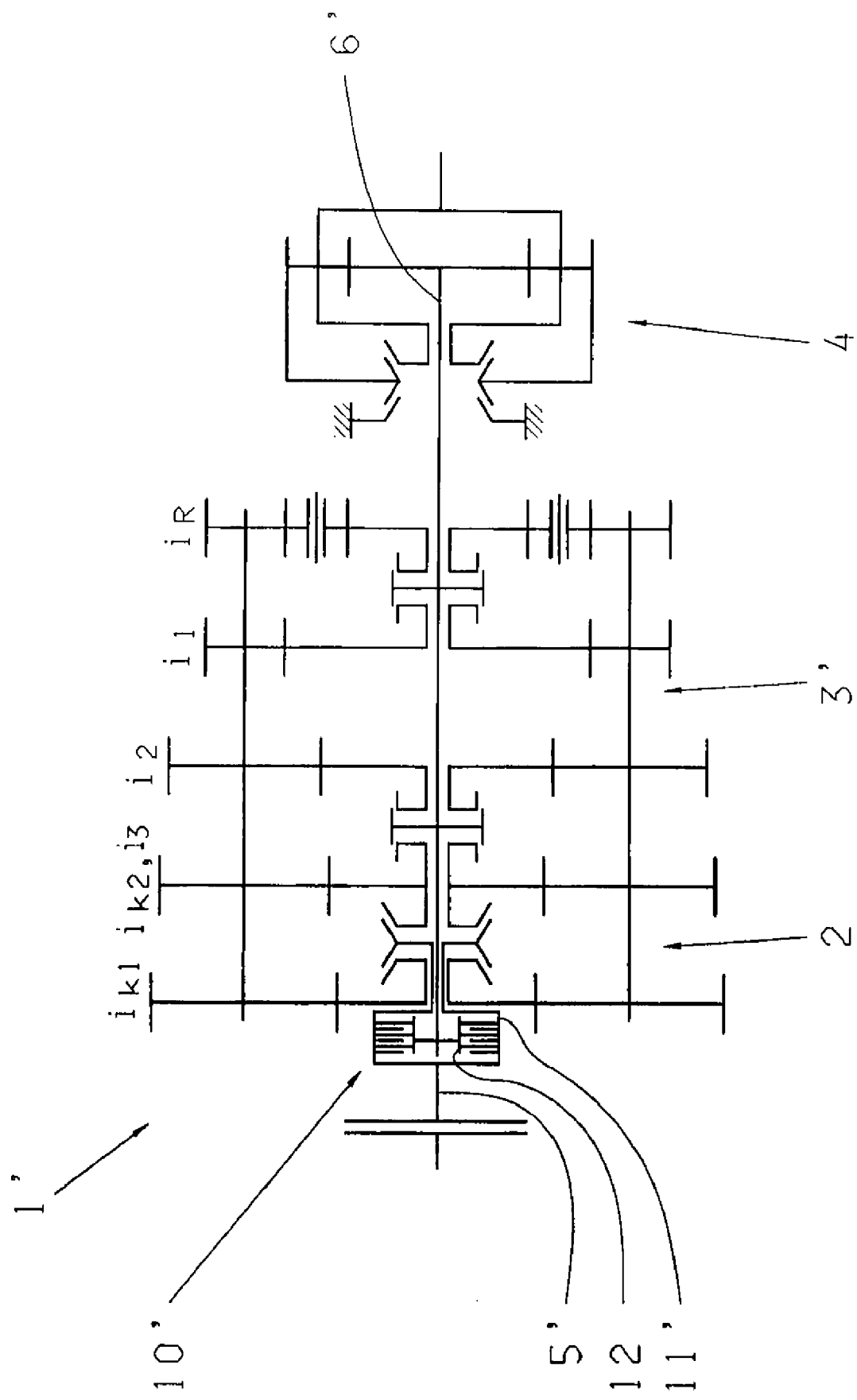
FIG. 3 shows a second embodiment of a multi-group transmission according to the invention.

FIG. 3 shows a further embodiment with a two-countershaft transmission 1' configured as a variation with 12 gears, where the 10$^{th}$ gear is designed as a direct gear. A main transmission 3' is realized herein as a group with three gears. The design is otherwise similar to the variation with 16 gears. A detailed description of the individual components is omitted here for this reason and only an arrangement of a disk clutch 10' will be discussed. The latter is brought forward at the input side ahead of the transmission 1', where a main shaft 6' is guided through the power split transmission 2 and connected to the inner clutch part 12. An outer clutch part 11' connects an input shaft 5' to the power split transmission 2. No additional installation room is required between the main transmission 3' and the power split transmission 2 in the variation of the main transmission 3' with three gears due to the axially forward positioning of the disk clutch 10'.

A process for changing gears in a multi-group transmission relies essentially on the fact that an intermediate gear is shifted via the direct connection between a transmission input shaft 5, 5' and a transmission main shaft 6, 6' during gear changes from an original gear into a target gear.

FIGS. 2A to 2D show different phases during gear change from the $11^{th}$ gear to the $13^{th}$ gear in the above-described, automated, two-speed countershaft transmission 1, where the $16^{th}$ gear is intermediately shifted into as a direct gear in between.

Figure 2A:
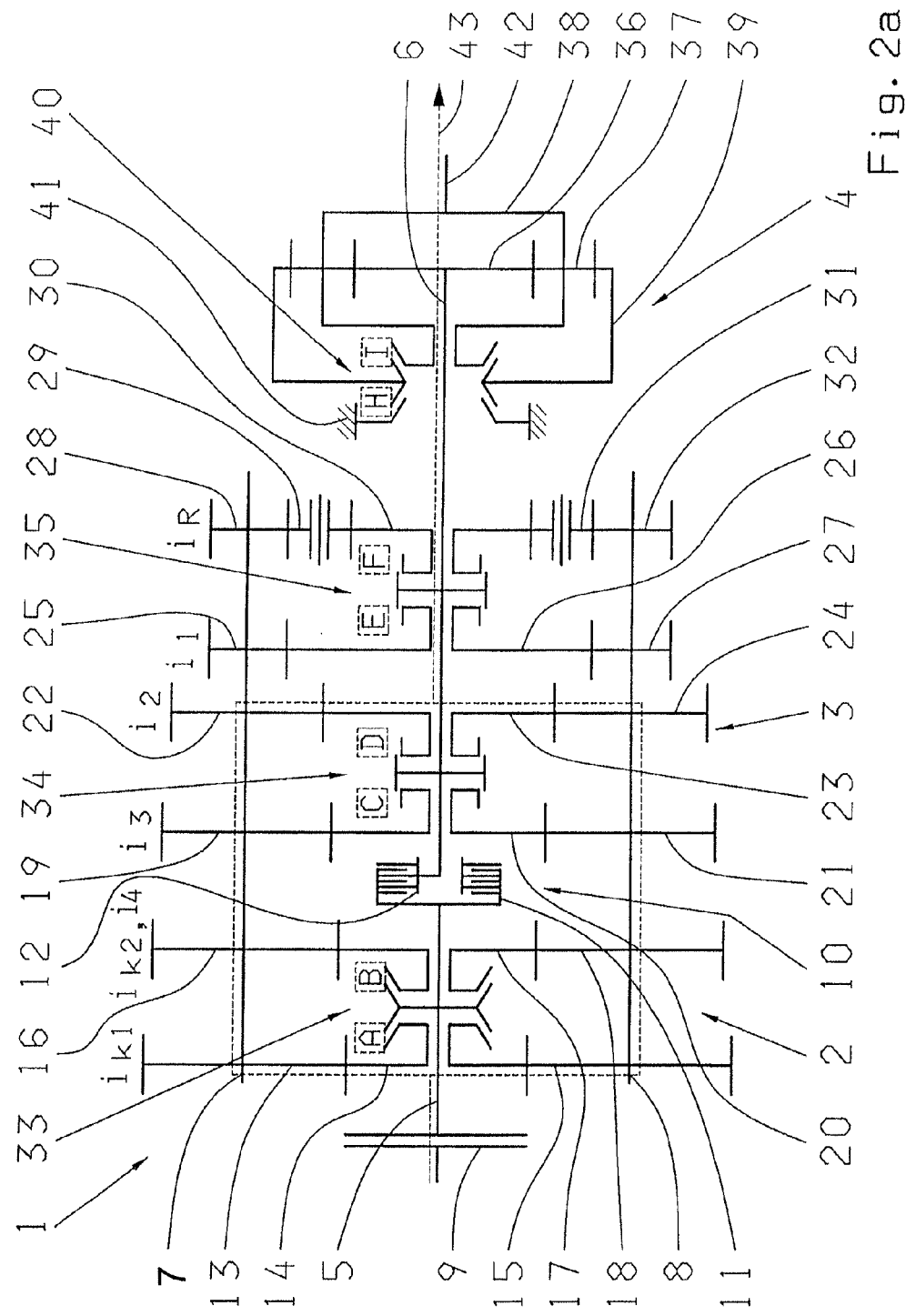
FIG. 2A shows a representation of the transmission with torque flow when the original gear is engaged.
Figure 2B:
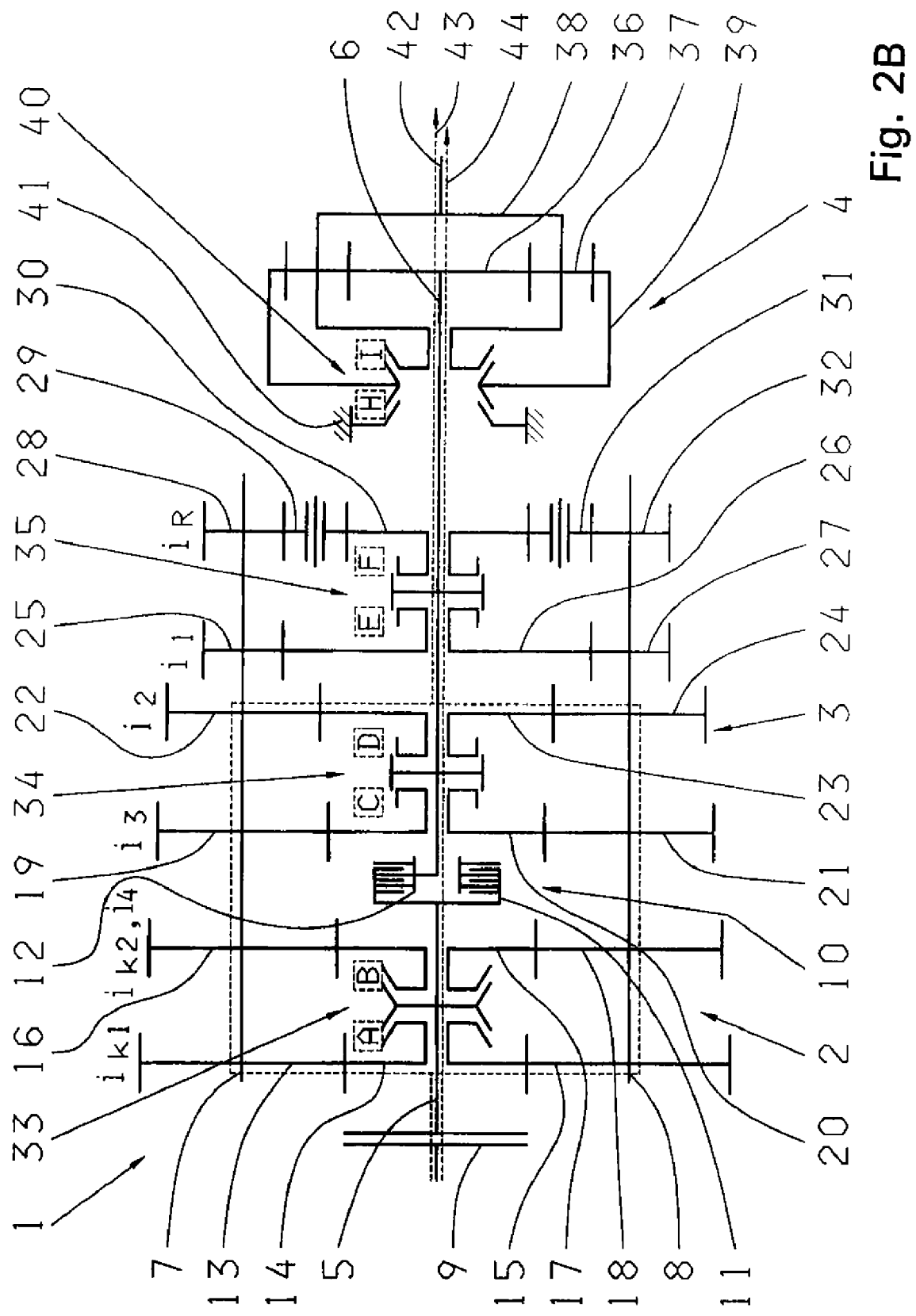
FIG. 2B shows a representation of the transmission with torque flow during a gear change from the original gear into a target gear with the disengagement of the original gear and engaging of the intermediate gear.

A torque flow 43 with engaged $11^{th}$ gear is shown in FIG. 2A with a dashed line. The gear constant $i_{k1}$ is shifted, the main transmission 3 is shifted to the $2^{nd}$ gear $i_2$, and the range transmission 4 is located in the upper gear range. The $11^{th}$ gear is disengaged in FIG. 2B, where the power split transmission 2 and the main transmission 3 become loadless. The corresponding jaws and synchronizations are shifted to neutral. The direct gear is shifted so that a direct torque flow 44 is produced (dashed line solely parallel to the input shaft 5 and the main shaft 6).

Figure 2C:
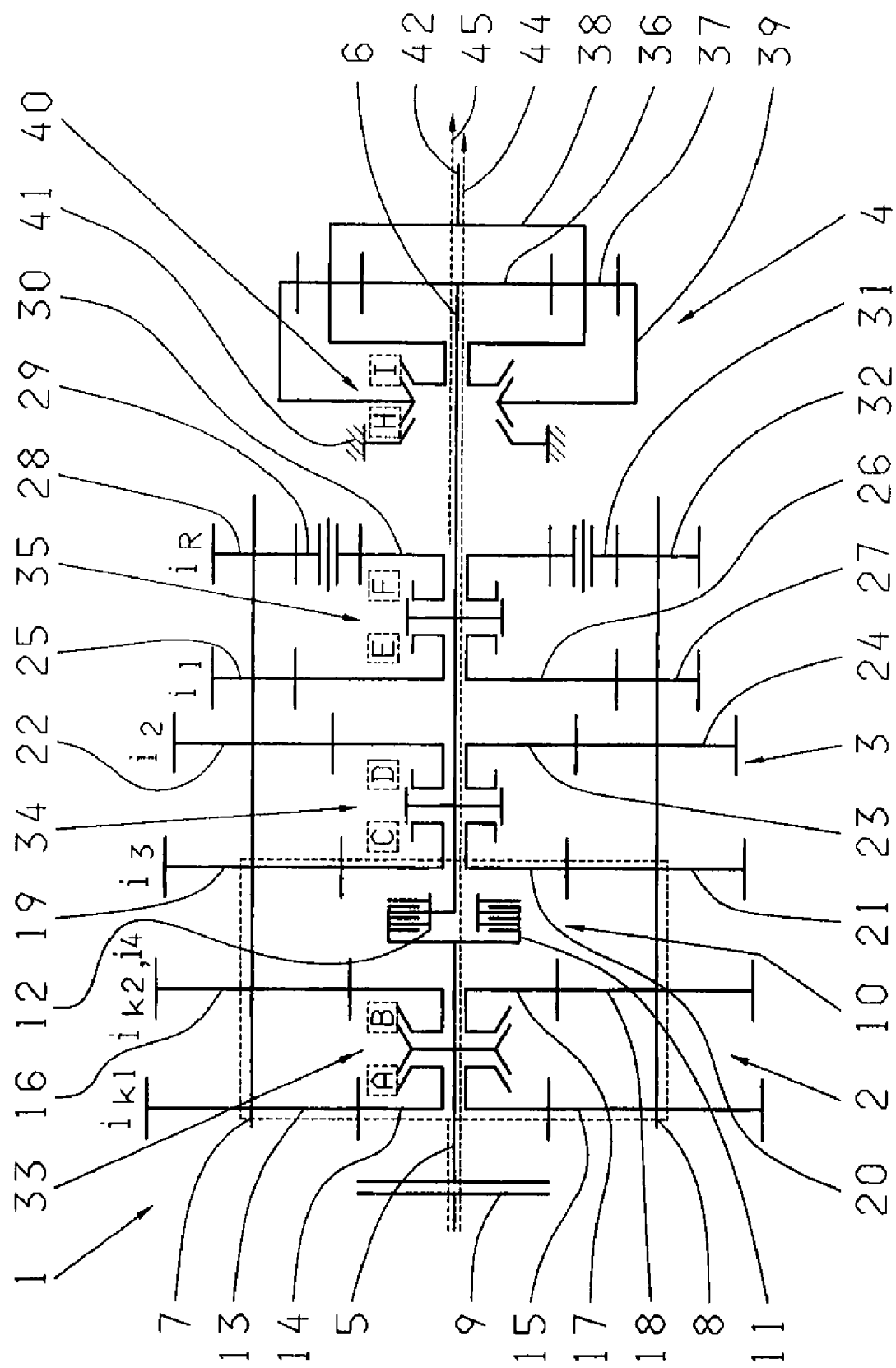
FIG. 2C shows a representation of the transmission with torque flow during the gear change with engagement of the target gear and disengaging of the intermediate gear.
Figure 2D:
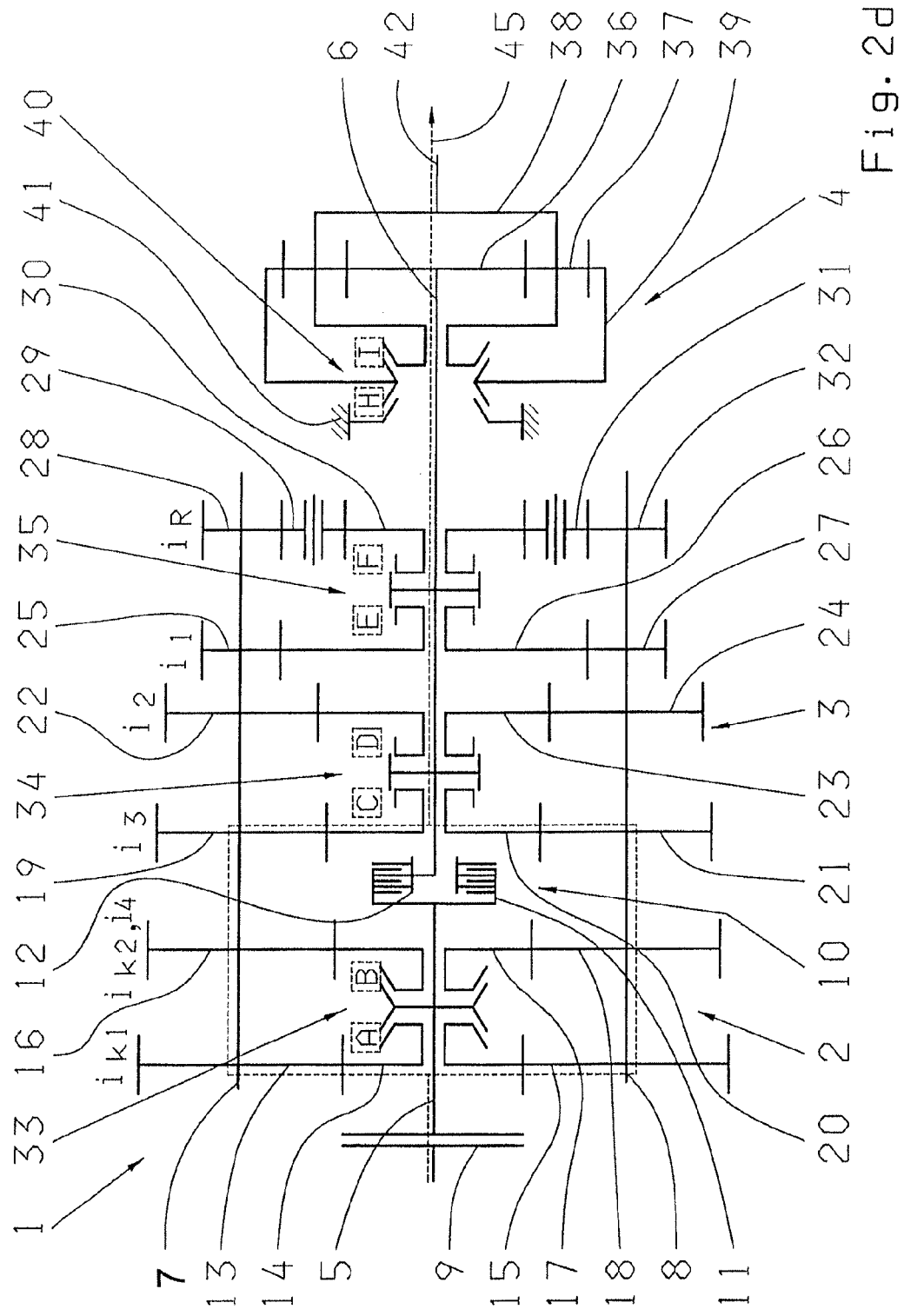
FIG. 2D shows a representation of the transmission with torque flow when the target gear is engaged.

The direct gear or the disk clutch 10 is disengaged in the following FIG. 2C, that is, the direct connection between the input shaft 5 and the main shaft 6 is severed, the power split transmission 2 is (again) shifted to the gear constant $i_{k1}$; the main transmission 3 is now shifted into the $3^{rd}$ gear $i_3$, and the range transmission 4 is still located in the upper gear range. The $13^{th}$ gear is then engaged. The shifting operation is completed in FIG. 2D, where a torque flow 45 is produced in the $13^{th}$ gear.

Figure 4:
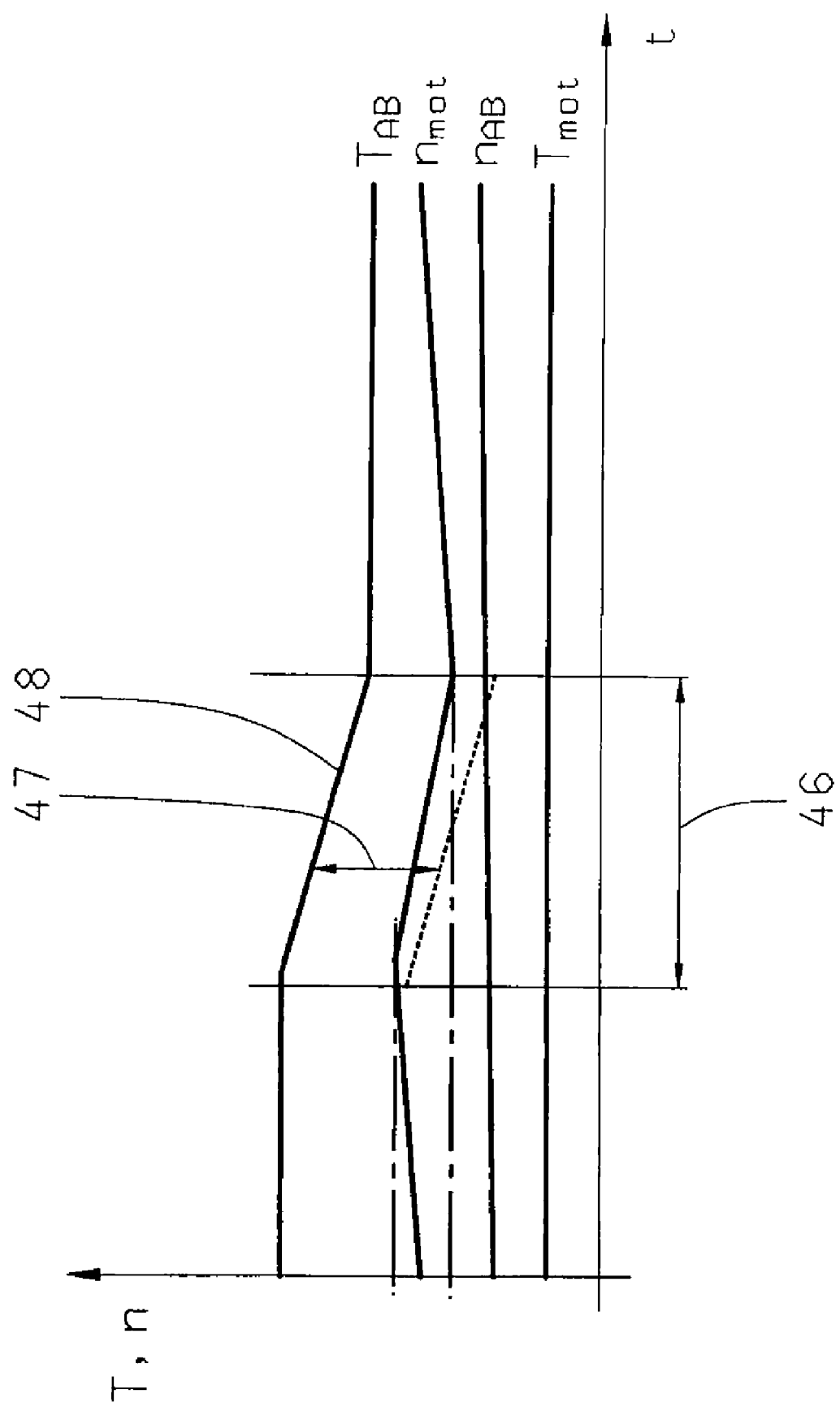
FIG. 4 shows a speed/torque curve diagram during the gear change of FIGS. 2A to 2D.

Finally, FIG. 4 shows a diagram in which the speed and torque curve, during the above-described gear change is clarified.

A time period 46 is represented therein, within which the gear change is carried out. During shifting into direct gear, the disk clutch 10 raises the rotationally speed of a drive engine $n_{mot}$ of the vehicle to a connecting speed of the target gear, for example, from 1900 1/min to 1319 1/min. A motor torque $T_{mot}$ remains the same during the shifting operation, but an output rotational speed $n_{AB}$ of the transmission 1 increases slightly. A corresponding dynamic torque 48, which is released with an output torque curve $T_{AB}$ during the shifting operation, is utilized therein as a direct gear potential 47 of the direct gear in order to support the tractive force of the vehicle during gear change.

REFERENCE NUMERALS 1, 1' two-countershaft transmission
2 first transmission group/input power split transmission
3, 3' second transmission group/main transmission
4 third transmission group/range transmission
5, 5' input shaft
6, 6' main shaft
7 countershaft
8 countershaft
9 startup element/engine clutch
10, 10' load shifting mechanisms/disk clutch
11, 11' outer clutch part
12 inner clutch part
13 gear wheel $i_{k1}$
14 gear wheel $i_{k1}$
15 gear wheel $i_{k1}$
16 gear wheel $i_{k2}$, $i_4$
17 gear wheel $i_{k2}$, $i_4$
18 gear wheel $i_{k2}$, $i_4$
19 gear wheel $i_3$
20 gear wheel $i_3$
21 gear wheel $i_3$
22 gear wheel $i_2$
23 gear wheel $i_2$
24 gear wheel $i_2$
25 gear wheel $i_1$
26 gear wheel $i_1$
27 gear wheel $i_1$
28 gear wheel $i_R$
29 gear wheel $i_R$
30 gear wheel $i_R$
31 gear wheel $i_R$
32 gear wheel $i_R$
33 shifting mechanism
34 shifting mechanism
35 shifting mechanism
36 sun gear
37 planetary gear set
38 planetary gear carrier
39 ring gear
40 shifting mechanism
41 housing
42 output shaft
43 torque flow
44 torque flow
45 torque flow
46 gear change duration
47 direct gear potential
48 dynamic torque
$i_{k1}$ power split transmission gear constant
$i_{k2}$ power split transmission gear constant
$i_1$ main transmission gear
$i_2$ main transmission gear
$i_3$ main transmission gear
$i_4$ main transmission gear
$i_R$ main transmission reverse gear
A shift position power split transmission
B shift position power split transmission
C shift position main transmission
D shift position main transmission
E shift position main transmission
F shift position main transmission
H shift position main transmission
I shift position main transmission
$T_{AB}$ output torque
$T_{mot}$ engine torque
$n_{AB}$ output speed
$n_{mot}$ engine speed

The invention claimed is:

1. An automated multi-group standard transmission for a utility vehicle, the automated multi-group standard transmission comprising:
    at least first and second multi-speed transmission groups (2, 3, 3') being sequentially arranged one after another such that power flows from the first multi-speed transmission group (2) to the second multi-speed transmission group (2, (3, 3') and a multitude of gears are engagable;
    the first multi-speed transmission group (2) having a transmission input shaft (5, 5') which is connectable to a drive engine via a startup element (9);

the second multi-speed transmission group (3, 3') having a transmission main shaft (6, 6');

a load shifting mechanism (10, 10') being located between the transmission input shaft (5, 5') and the transmission main shaft (6, 6') for temporarily connecting the transmission input shaft (5, 5') directly with the transmission main shaft (6, 6'), upon engagement of the load shifting mechanism (10, 10'), to create a direct intermediate gear with a gear ratio of 1:1, which is only engaged during a shift in the automated multi-group standard transmission from an original gear to a target gear, so that the intermediate gear compensates for any tractive force interruption during the shift.

2. The automated multi-group standard transmission according to claim 1, wherein the load shifting mechanism (10, 10') is a disk clutch.

3. The automated multi-group standard transmission according to claim 1, wherein the load shifting mechanism (10) is arranged between the first multi-speed transmission group (2) and the second multi-speed transmission group (3).

4. The automated multi-group standard transmission according to claim 1, wherein the load shifting mechanism (10') is arranged between the startup element (9) and the first multi-speed transmission group (2).

5. The automated multi-group standard transmission according to claim 1, wherein the first multi-speed transmission group (2) is a power split transmission and the second multi-speed transmission group (3, 3') is one of a two-speed main transmission, a three-speed main transmission and a four-speed main transmission, and a third transmission group (4) which is a two-speed range transmission arranged downstream of the second multi-speed transmission group (3, 3').

6. The automated multi-group standard transmission according to claim 1, wherein at least one of an electric, a hydraulic and a pneumatic transmission controller automatically shifts gears of at least one of the at least two multi-speed transmission groups (2, 3, 3', 4).

7. The automated multi-group standard transmission according to claim 1, wherein the load shifting mechanism (10, 10') is located between the first multi-speed transmission group (2) and the second multi-speed transmission group (3, 3') and a plane passing through the load shifting mechanism (10, 10') separates the first multi-speed transmission group (2) from the second multi-speed transmission group (3, 3').

8. The automated multi-group standard transmission according to claim 1, wherein both the first multi-speed transmission group (2) and the second multi-speed transmission group (3, 3') both have common first and second counter shafts (7, 8).

9. The automated multi-group standard transmission according to claim 1, wherein each engagable shift element of the automated multi-group standard transmission is supported by either the transmission input shaft (5, 5') or the transmission main shaft (6, 6').

10. The automated multi-group standard transmission according to claim 1, wherein the automated multi-group standard transmission has at least 12 separate gear ratios.

11. An automated multi-group standard transmission for a utility vehicle, the automated multi-group standard transmission comprising:

at least first and second multi-speed transmission groups (2, 3, 3') being sequentially arranged one after another such that power flows from the first multi-speed transmission group (2) to the second multi-speed transmission group (2, (3, 3') and a multitude of gears are engagable;

the first multi-speed transmission group (2) having a transmission input shaft (5, 5') which is connectable to a drive engine via a startup element (9);

the second multi-speed transmission group (3, 3') having a transmission main shaft (6, 6');

a load shifting mechanism (10, 10') being located between the transmission input shaft (5, 5') and the transmission main shaft (6, 6') for temporarily directly connecting the transmission input shaft (5, 5') with the transmission main shaft (6, 6'), upon engagement of the load shifting mechanism (10, 10'), to create an intermediate gear only during a shift in the automated multi-group standard transmission from an original gear to a target gear and the intermediate gear compensates for any tractive force interruption during the shift; and at least the first and the second multi-speed transmission groups (2, 3, 3') having a dual-countershaft design.

12. A method of changing gears in an automated multi-group standard transmission of a utility vehicle, having at least first and second multi-speed transmission groups (2, 3, 3') arranged sequentially one after an other such that power flows from the first multi-speed transmission group (2) to the second multi-speed transmission group (2, (3, 3') and a multitude of gears are engagable, the method comprising the steps of:

providing the first multi-speed transmission group (2) with a transmission input shaft (5, 5') which is connectable to a drive engine via a startup element (9);

providing the second multi-speed transmission group (3, 3') with a transmission main shaft (6, 6');

connecting the transmission input shaft (5, 5') directly with the transmission main shaft (6, 6'), via a load shifting mechanism (10, 10'), only to shift a direct intermediate gear with a gear ratio of 1:1, during a gear shift in the automated multi-group standard transmission from an original gear to a target gear, and compensate for any tractive force interruption during the shift.

13. The method of changing gears in an automated multi-group standard transmission according to claim 12, further comprising the steps of:

a) shifting shift elements of the first and the second multi-speed transmission groups (2, 3, 3') to a neutral position with incipient slip of the startup element (9), and decoupling the first and the second multi-speed transmission groups (2, 3, 3') upon disengagement of the original gear, during the shift of the intermediate gear;

b) directly coupling the transmission input shaft (5, 5') and the transmission main shaft (6, 6') concurrently with the step a) and shifting the intermediate gear with subsequent modification of a speed of the drive engine and a speed of the transmission input shaft (5, 5') and the transmission main shaft (6, 6'), which are directly connected until a speed of the target gear is reached; and c) shifting the first multi-speed transmission group (2) and the second multi-speed transmission group (3, 3') from the original gear to the target gear and concurrently disconnecting the direct connection between the transmission input shaft (5, 5') and the transmission main shaft (6, 6').

14. The method according to claim 12, further comprising the step of locating the load shifting mechanism (10, 10') between the first multi-speed transmission group (2) and the second multi-speed transmission group (3, 3') so that a plane passing through the load shifting mechanism (10, 10') separates the first multi-speed transmission group (2) from the second multi-speed transmission group (3, 3').

15. The method according to claim 12, further comprising the step of providing both the first multi-speed transmission group (2) and the second multi-speed transmission group (3, 3') with common first and second counter shafts (7, 8).

16. The method according to claim 12, further comprising the step of supporting each engagable shift element of the automated multi-group standard transmission by either the transmission input shaft (5, 5') or the transmission main shaft (6, 6').

17. The method according to claim 12, further comprising the step of providing the automated multi-group standard transmission with at least 12 separate gear ratios.

* * * * *